(12) United States Patent
Hartwell

(10) Patent No.: US 10,200,581 B2
(45) Date of Patent: Feb. 5, 2019

(54) HEADS DOWN INTELLIGENT DISPLAY AND PROCESSING

(71) Applicant: Peter G. Hartwell, Menlo Park, CA (US)

(72) Inventor: Peter G. Hartwell, Menlo Park, CA (US)

(73) Assignee: Peter G. Hartwell, Menlo Park, CA (US)

( * ) Notice: Subject to any disclaimer, the term of this patent is extended or adjusted under 35 U.S.C. 154(b) by 0 days.

(21) Appl. No.: 15/475,945

(22) Filed: Mar. 31, 2017

(65) Prior Publication Data

US 2017/0289488 A1 Oct. 5, 2017

Related U.S. Application Data

(60) Provisional application No. 62/315,924, filed on Mar. 31, 2016.

(51) Int. Cl.
| | |
|---|---|
| *H04N 5/225* | (2006.01) |
| *H04M 1/02* | (2006.01) |
| *H04N 5/232* | (2006.01) |
| *G03B 17/56* | (2006.01) |
| *G06F 3/14* | (2006.01) |
| *G06K 9/22* | (2006.01) |
| *G06K 9/00* | (2006.01) |

(52) U.S. Cl.
CPC ......... *H04N 5/2254* (2013.01); *G03B 17/565* (2013.01); *G06F 3/14* (2013.01); *H04M 1/0264* (2013.01); *H04N 5/23293* (2013.01); *G06K 9/00664* (2013.01); *G06K 9/228* (2013.01)

(58) Field of Classification Search
CPC ............. H04N 5/44591; H04N 5/4403; H04N 5/23293; H04N 5/2254; G06K 9/00664
See application file for complete search history.

(56) References Cited

U.S. PATENT DOCUMENTS

| | | | |
|---|---|---|---|
| 8,520,080 B2 * | 8/2013 | Havens | H04N 5/2258 348/207.99 |
| 8,953,841 B1 * | 2/2015 | Leblang | G06K 9/00671 345/633 |
| 9,253,416 B2 * | 2/2016 | Dunn | H04M 1/72544 |
| 9,654,675 B2 * | 5/2017 | Kessler | G03B 17/565 |
| 2005/0146600 A1 * | 7/2005 | Chipchase | H04M 1/72522 348/14.02 |
| 2008/0194323 A1 * | 8/2008 | Merkli | A63F 13/02 3/2 |

(Continued)

*Primary Examiner* — Shahbaz Nazrul
(74) *Attorney, Agent, or Firm* — Hickman Palermo Becker Bingham LLP

(57) ABSTRACT

Techniques provided for using hardware and software to modify a mobile device to improve the safety and awareness of a user to their environmental surroundings. One embodiment of the invention is to update mobile device applications to include live video using the built in rear camera of area ahead of the user as background image. Rear camera would normally be viewing ground, so an embodiment includes a custom case or other attachment to the mobile device with a mirror to allow rear camera to view area ahead. The case or attachment positions the mirror relative to the camera and has an adjustable angle to achieve the correct field of view for the way (or posture) the user is holding the mobile device.

13 Claims, 4 Drawing Sheets

(56) References Cited

U.S. PATENT DOCUMENTS

| | | | |
|---|---|---|---|
| 2013/0231157 A1* | 9/2013 | Chung | H04M 1/0264 455/556.1 |
| 2013/0271744 A1* | 10/2013 | Miller | G01C 3/08 356/4.01 |
| 2013/0293586 A1* | 11/2013 | Kaino | G08G 1/005 345/633 |
| 2014/0171150 A1* | 6/2014 | Hurst | H04M 1/0264 455/556.1 |
| 2014/0232930 A1* | 8/2014 | Anderson | G03B 17/565 348/369 |
| 2014/0300466 A1* | 10/2014 | Park | G08B 19/00 340/539.11 |
| 2015/0015780 A1* | 1/2015 | Graham | H04N 5/2252 348/376 |
| 2015/0062416 A1* | 3/2015 | Vance | G03B 17/17 348/369 |
| 2015/0123992 A1 | 5/2015 | Mahan et al. | |
| 2015/0189158 A1* | 7/2015 | Hailey | H04N 5/2252 348/333.12 |
| 2015/0248772 A1* | 9/2015 | Gove | H04N 5/247 348/158 |
| 2015/0365574 A1* | 12/2015 | Lai | H04N 5/247 348/222.1 |
| 2016/0034058 A1 | 2/2016 | Stauber et al. | |
| 2017/0301107 A1* | 10/2017 | Sasaki | G06K 9/6218 |

\* cited by examiner

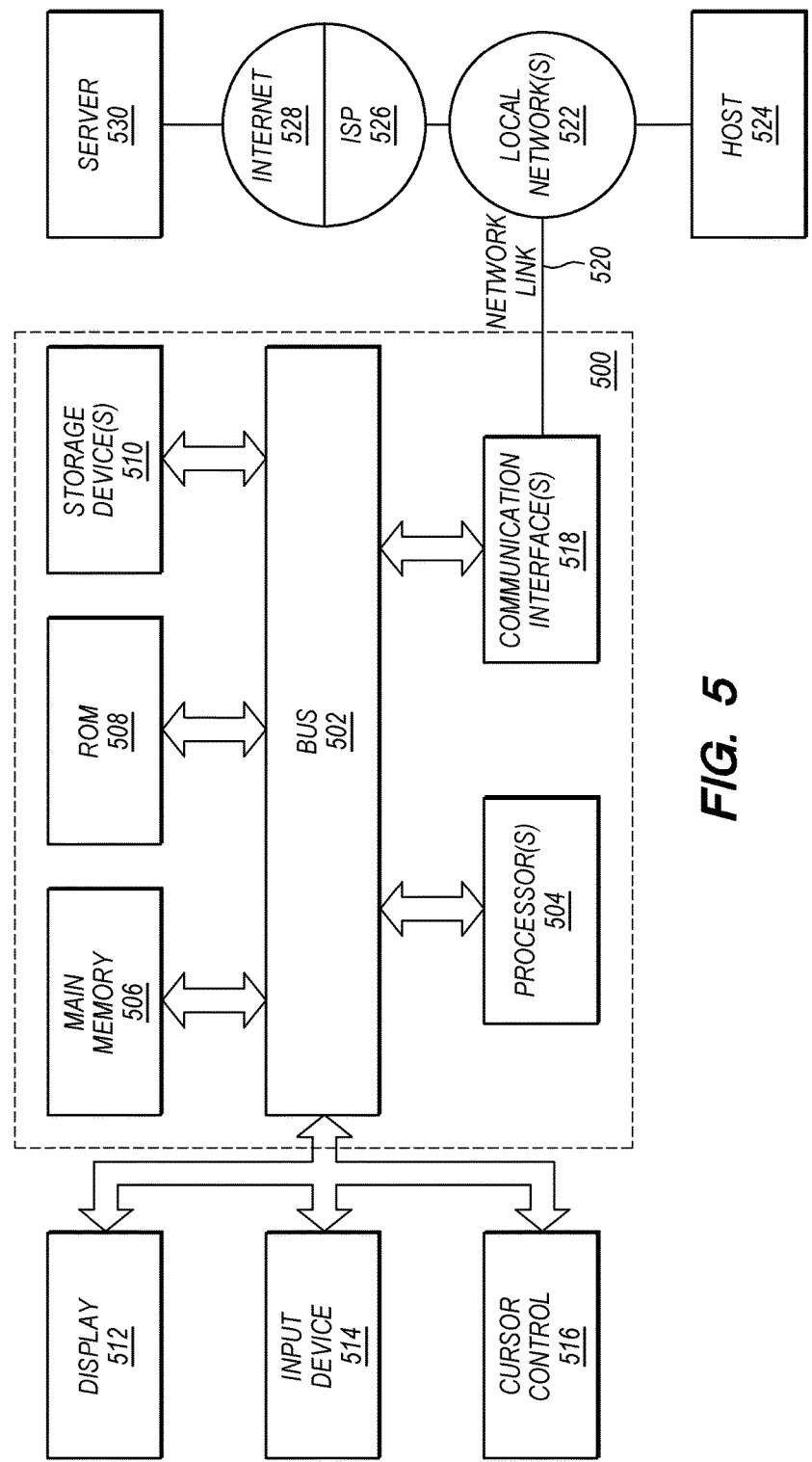

HEADS DOWN INTELLIGENT DISPLAY AND PROCESSING

CROSS-REFERENCE TO RELATED APPLICATIONS; BENEFIT CLAIM

This application claims the benefit of Provisional Application No. 62/315,924, filed Mar. 31, 2016, the entire contents of which is hereby incorporated by reference as if fully set forth herein, under 35 U.S.C. § 119(e).

FIELD OF THE INVENTION

The present invention is directed to assisting the user of a mobile electronic device who is moving through the environment.

BACKGROUND

Mobile phone cameras are highly underutilized, being generally used only on an active basis to record photos and videos. There is an opportunity to turn the camera and other on phone input devices (for instance microphones) into primary sensing devices that augment the phone's ability to process its immediate environment on behalf of the user. In this way the phone can better imitate natural human sensing capabilities even when users are distracted by the phone and it's visual and audio interfaces (i.e. watching a video with headphones on).

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 5 is a block diagram illustrating components of a mobile device with which the techniques described herein may be used.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described herein for using hardware and software to modify a mobile device to improve the safety and awareness of a user to their environmental surroundings. One embodiment of the invention is to update mobile device applications ("apps") to include live video using the built in rear camera of area ahead of the user as background image. Rear camera would normally be viewing ground, so an embodiment includes a custom case or other attachment to the mobile device with a mirror to allow rear camera to view area ahead. The case or attachment positions the mirror relative to the camera and has an adjustable angle to achieve the correct field of view for the way (or posture) the user is holding the mobile device. The mirror can flip up to be flush with case for storage and/or protection of the mirror and rear facing camera.

The techniques described herein create a path into augmented reality (AR) as a platform that begins to overlay data with surroundings on a wide variety of existing mobile devices. Embodiments include applications to improve the safety of the user, but the techniques described herein may be expanded, for example, to help the user navigate and have a richer experience of their surrounding world.

The following description and the drawings contain certain illustrative aspects of the specification. These aspects are indicative, however, of but a few of the various ways in which the principles of the specification may be employed.

Hardware Features

Figure 1:
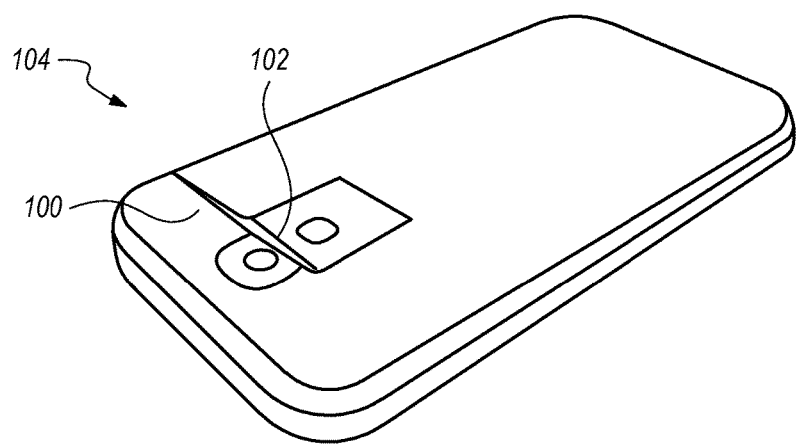
FIG. 1 depicts a mobile device with an attached mirror allowing the included rear facing camera to instead view the space ahead of the user, according to an embodiment of the invention.

FIG. 1 illustrates a mobile phone having a forward viewing system 104 according to an embodiment. In the illustrated embodiment, a mirror 100 attaches to the mobile device (for example a mobile phone) to allow the camera in the phone to view the area ahead or around the phone user. The mirror may integrate into a case for the device or be some other accessory that mounts to the device. The mirror can hinge 102 to allow the user to set an angle appropriate to the way they hold the device. The hinge will also allow the mirror to fold closed and acts as lens cover.

According to an embodiment, the forward viewing system 104 positions the mirror at an angle that allows a forward view to be seen through the lens when the mobile device is held at an angle of 75 degrees or less relative to ground. The mirror may have a flat or convex shape for enhanced or desired field of view in the image from the camera. The accessory attaching the mirror to the mobile device may allow interchangeable mirrors so the user can change the field of view depending on their environment or preference.

The accessory with mirror allows the heads down display features to be incorporated into many existing mobile devices without further modifications by enabling existing cameras to view the area ahead or around the user.

Software Features

Figure 2:
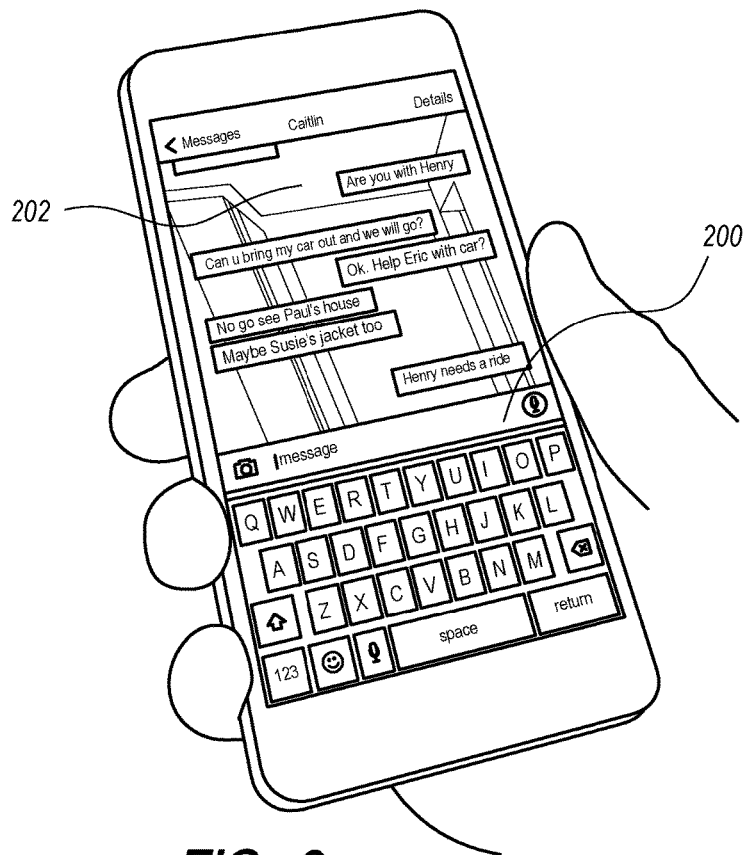
FIG. 2 depicts a sample application overlaid on a live image of the space ahead of the device user, according to an embodiment of the invention.

In one implementation, a custom texting, social media, web browser, or other app could be developed or modified to allow live video overlay or background of the camera feed in addition to the standard user interface. See FIG. 2. FIG. 2 illustrates mobile phone that is executing a texting application. In the foreground, the texting application has a conventional interface 200, with controls for entering text and a display of recently sent and received texts. The background image of the texting application is a live video feed 202 from the camera build into the mobile phone.

However, rather than displaying the floor (which is the direction the camera is pointed), the video feed 202 displays what is currently in front of the user. The image is of the forward view, rather than the floor, because a mirror is attached to the mobile device at a position and at an angle to cause the camera lens to capture the front view through reflection of the mirror.

In another implementation, the mobile device operating system could add a framework or API that any app could call to enable video overlay or background in addition to the standard user interface.

Figure 3:
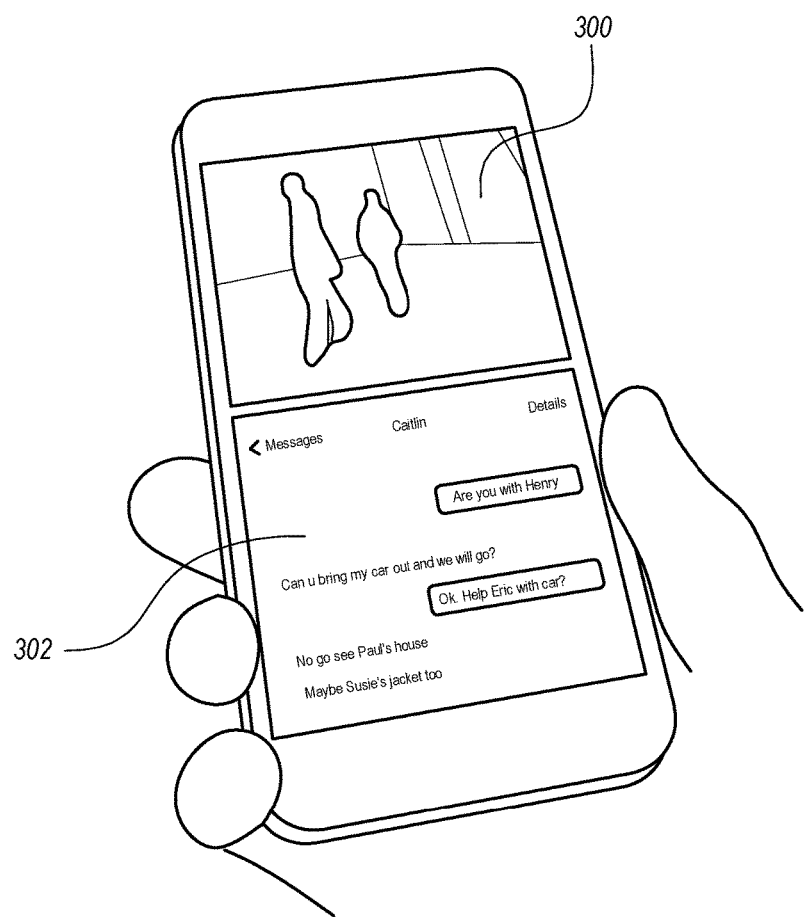
FIG. 3 depicts a screen interface split into two parts with a live image of the space ahead of the user in one part of the screen and the current application in the other part; according to an embodiment of the invention.

The mobile device could display a split screen (with two or more parts) wherein one part is the live image of the area ahead of the user and the other part or parts contain active applications. See FIG. 3. Referring to FIG. 3, it depicts a screen interface split into two parts with a live image of the space ahead of the user in one part of the screen 300 and the current application in the other part 302; according to an embodiment of the invention. In the live image, objects ahead of the user have been identified to help the user to take action in relation to the objects.

Software in the mobile device can analyze the image or video of the area ahead of the user and use object detection algorithms to detect potential hazards ahead. The mobile device can then alert the user with visual and/or audio and/or haptic cues or feedback to draw the user's attention away from the application and to the area ahead so the user can take action. For visual cues, objects may be outlined in various colors or the display may flash or the application may be hidden completely and the whole display change to only the live image of the area ahead of the user. In one embodiment the transparency of the application could change on a continuum of from opaque to transparent depending on the number and or distance to objects ahead of the user.

Many mobile devices include activity classification features or motion detection algorithms. Applying activity classification to the forward viewing system described herein, the camera may turn on or off automatically when the user is moving (walking) to improve system battery lifetime. Activity classification could also be employed to automatically switch the user interface in an application between normal and the heads down mode with video depending on stationary vs walking, running, etc.

In some embodiments, the application or API analyzes the image of the area around the user for color, brightness or contrast and adjust the color of the application content for higher contrast or improved usability.

Extensions

The built in camera in a mobile device could be included or mounted in the mobile device in such a way to permit it to rotate or change its angle relative to the device to enable imaging of the area ahead or around the user. For example a camera mounted at top of phone could rotate from pointing down to pointing ahead. Such an implementation of a built in camera would not require a mirror to enable a heads down display.

The case or accessory including the mirror could also include a battery. Having an additional battery will help to make up for additional power usage of the camera in the heads down display application. A case or accessory with a battery would in general be thicker and will provide more space for the folding mirror.

Figure 4:
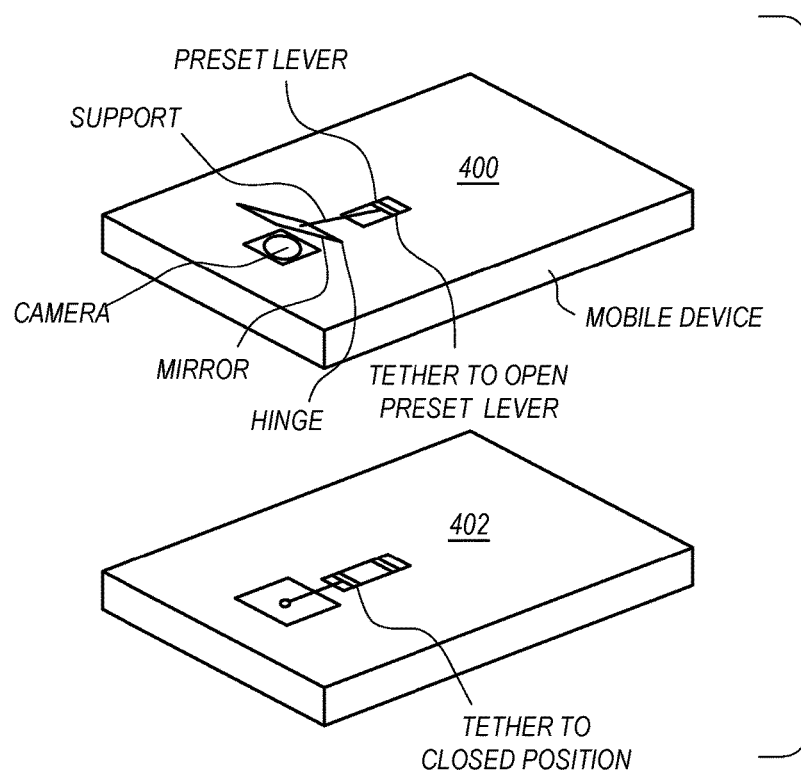
FIG. 4 depicts a mirror hinge mechanism with the ability to preset the mirror open angle.

The mirror angle could be preset with a switch/lever inside case or accessory. A flip of the wrist motion (like opening a zippo lighter) actuates mirror down to the preset position where the mirror or mirror support catches with a magnet or other tethering device and also emits a click sound to provide feedback to the user that the position is locked. The strength of the tether is such that another flip motion can be used to reverse the slide action and close the mirror. See FIG. 4. It illustrates a forward viewing system that has been incorporated into the case of a mobile device. In open position 400, the mirror portion is supported by a tether that has a present length to provide an angle that allows forward viewing. In closed position 402, the tether may be moved forward to a new position that allows the mirror to close flush with the case surface.

Further embodiments integrate other range finding sensors or technologies such as, but not limited to beacons, ultrasonic range finding, LIDAR, RADAR, etc. into the mobile device for additional collision detection or object recognition.

A camera capable of imaging in the infra-red spectrum could be used to enable imaging in low-light situations. An infra-red emitting LED or other light Source could be used to help illuminate the area around the user to enhance image quality of the infrared camera. An infrared camera system could also collect and process information that is displayed in non-visible light form (IR ads and beacons)

Multiple cameras could be used for depth information of objects or to provide a much wider field of view, up to 360 of the surroundings of the user.

Image recognition software in the mobile device could be implemented to recognize specific people, places, or objects. Examples include, but are not limited to friends, food, discount sale promotions, currency or other things that the user may otherwise have overlooked. User preferences (in the system or app) could control notifications of recognized objects and level of feedback to user.

Device Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   displaying on a screen of a mobile device an interface of an application that is executing on the mobile device;

concurrently with displaying the interface on the screen, displaying on the screen at least a portion of a live feed captured by a lens, of a camera of the mobile device, that is pointed at a mirror of a forward viewing system that is connected to the mobile device;

wherein the forward viewing system positions the mirror at an angle that allows a forward view to be seen through the lens when the mobile device is held at an angle of 75 degrees or less relative to ground; and causing the mobile device to turn on and off the display of the live feed based, at least in part, on contents of the live feed.

2. The method of claim 1, wherein displaying the portion of the live feed is performed by displaying the live feed as background while displaying the interface of the application as foreground.

3. The method of claim 1, wherein displaying the portion of the live feed is performed by displaying a split screen where one part of the screen includes the live feed while another part of the screen includes the interface of the application.

4. The method of claim 1 further comprising:
causing the mobile device to automatically detect potential hazards in the live feed; and
causing the mobile device to automatically generate an alert in response to detecting a potential hazard in the live feed.

5. The method of claim 1 further comprising: causing the mobile device to detect and generate alerts relating to particular items or persons in the live feed.

6. The method of claim 1 further comprising: causing the mobile device to emit an infra-red light and causing the mobile device generate alerts for potential hazards that are detected by the mobile device based, at least in part, on the infra-red light.

7. The method of claim 1 further comprising: causing the mobile device to use one or more range finding sensors, in combination with the live feed, to detect potential hazards, and to generate alerts responsive to detecting potential hazards.

8. The method of claim 1 further comprising:
causing the mobile device to outline images of objects detected in the live feed; and
causing the mobile device to classify objects detected in the live feed, wherein images are outline based, at least in part, on how the corresponding objects have been classified;
wherein causing the mobile device to classify objects includes: causing the mobile device to classify a first object with a first designation, and causing the mobile device to classify a second object with a second designation that is different from the first designation, and wherein the image of the first object is outlined in a first color given the first designation, and the image of the second object is outlined in a second color given the second designation, wherein the first color is different than the second color.

9. A method comprising:
displaying on a screen of a mobile device an interface of an application that is executing on the mobile device;
concurrently with displaying the interface on the screen, displaying on the screen at least a portion of a live feed captured by a lens of a camera of the mobile device that is pointed at a mirror of a forward viewing system that is connected to the mobile device;
wherein the forward viewing system positions the mirror at an angle that allows a forward view to be seen through the lens when the mobile device is held at an angle of 75 degrees or less relative to ground; and
causing the mobile device to turn on and off the display of the live feed based, at least in part, on whether the mobile device is in motion.

10. A method comprising:
displaying on a screen of a mobile device an interface of an application that is executing on the mobile device;
concurrently with displaying the interface on the screen, displaying on the screen at least a portion of a live feed captured by a lens of a camera of the mobile device that is pointed at a mirror of a forward viewing system that is connected to the mobile device;
wherein the forward viewing system positions the mirror at an angle that allows a forward view to be seen through the lens when the mobile device is held at an angle of 75 degrees or less relative to ground; and
changing transparency of the interface on a continuum from opaque to transparent based on at least one of: number of objects detected in the live feed, or distance from the mobile device of objects detected in the live feed.

11. A forward viewing system for use with a mobile device that comprises a camera, wherein the forward viewing system includes a mirror disposed at an angle that allows a forward view to be seen through a lens of the camera when the mobile device is held at an angle of 75 degrees or less relative to ground, and means for transitioning the mirror between an open position and a closed position responses to flip-of-the-wrist motions.

12. The forward viewing system of claim 11 wherein the mirror is rotatably mounted.

13. The forward viewing system of claim 11 wherein the mirror is held at an angle relative to the mobile device accessory with a tether.

* * * * *